Feb. 16, 1926.
W. G. NORMAN
1,573,737
ROPE END STOPPER
Filed April 6, 1925
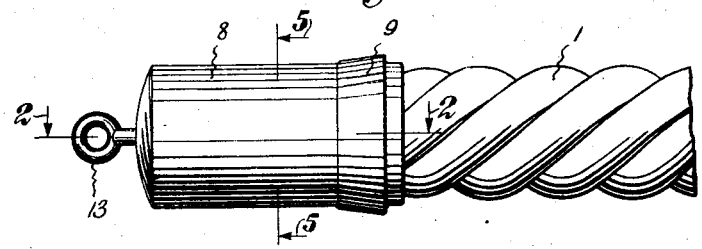
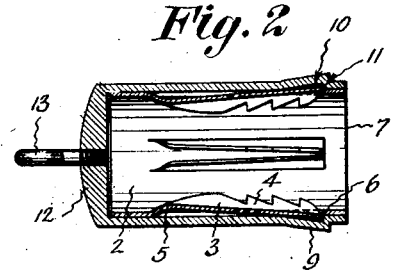 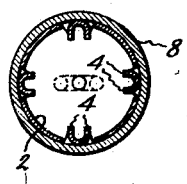
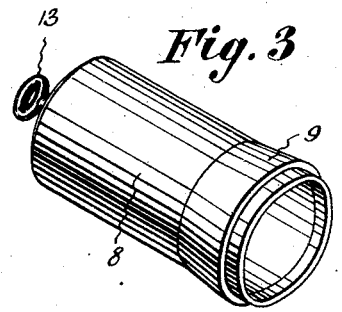 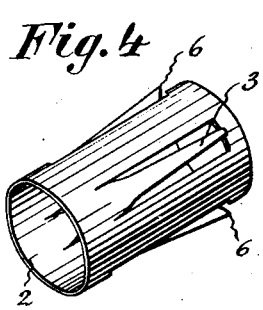
WITNESSES
Oscar Frey
Harry R. Seidel
INVENTOR
WILFRED G. NORMAN
BY
ATTORNEYS Patented Feb. 16, 1926.

1,573,737

UNITED STATES PATENT OFFICE.

WILFRED G. NORMAN, OF NEW YORK, N. Y.

ROPE-END STOPPER.

Application filed April 6, 1925. Serial No. 21,161.

*To all whom it may concern:*

Be it known that I, WILFRED G. NORMAN, a citizen of the United States, and a resident of the city of New York, borough of Manhattan, in the county and State of New York, have invented a new and Improved Rope-End Stopper, of which the following is a full, clear, and exact description.

This invention relates to stoppers for rope ends, and has for its object the provision of a device which may be readily applied to the sheared end of the rope in order to prevent unravelling of the rope end and also providing an attaching means whereby several rope ends may be readily connected together.

A further object of the invention is the provision of a device which may be readily applied to a rope end for not only preventing unravelling of the rope, but for providing a connection for readily securing the ends of ropes together and in such manner that the connected portion of the rope may be readily employed in connection with pulleys, the attaching device conforming to the circumference of the rope so that the same will not be readily discharged from the grooves of the pulleys when the rope is being driven.

With above recited and other objects in view, the invention resides in the novel construction set forth in the following specification, particularly pointed out in the appended claims and illustrated in the accompanying drawings, it being understood that the right is reserved to embodiments other than those actually illustrated herein, to the full extent indicated by the general meaning of the terms in which the claims are expressed.

In the drawings—

Figure 1 is a side view of the stopper constructed according to the principles of my invention.

Figure 2 is a transverse horizontal section taken along the line 2—2 of Figure 1.

Figure 3 is a view in perspective of the cooperating members forming the stopper for a rope end.

Figure 4 is a view in perspective of the inner member of the stopper.

Figure 5 is a transverse vertical section taken along the line 5—5 of Figure 1.

Referring more particularly to the drawings, a rope end 1 is shown encircled within a cylindrical member 2 which has at spaced points along its periphery and disposed longitudinally of the axis of the member, resilient fingers 3 which are cut from the body of the cylinder and bent along the side edges to form inturned flanges. The edges of these flanges are cut to form teeth 4, which, when forced into the rope, bite into the same and lock the cylindrical member 2 to the rope end. The fingers 3, as shown at 5, are bent inwardly and then outwardly, so that the free ends 6 project above the periphery of the cylindrical member 2 for a purpose which will be presently described. It will be noted that the teeth 4 are bent towards the outer end or the end which is opposite the receiving end 7 of the cylindrical member 2, so that when the rope end is inserted through the end 7 of the cylindrical member, the rope may be forced over the rearwardly protruding teeth without the teeth interfering with the insertion of said rope end.

The cylindrical member 2, when fixed upon the rope end, is then inserted within an outer casing 8 which has a flared outer end 9 forming an internal circumferential groove 10 which is located beyond the inner surface of the casing 8 so that when the member 2 is forced within the casing 8, the outwardly bent ends 6 of the fingers 3 will seat within the groove and be engaged by a shoulder 11 at the base of the groove and prevent displacement of the members 2 and 8.

The outer end of the casing 8 is closed by a base member 12 of sufficient thickness to receive a screw eye 13 and of sufficient strength to prevent the screw from being turned from said base member.

The stopper is particularly adapted for not only protecting rope ends, but for connecting rope ends together which are employed on pulleys in general use, but more particularly in shifting or operating curtains in the theatre. Furthermore, the rope ends so treated with a screw eye 13 may be employed in moving picture theatres for holding crowds at the aisles during the performances and as such may be readily connected between two posts by connecting the eye 13 at the opposite ends of the rope to hooks which are secured in the post.

Where the rope is employed on pulleys, a screw eye as shown at 13 may be connected at one end of the rope, while a hook is provided at the other end to be received within the screw eye for connecting the rope ends and providing a continuous belt. It will also be noted that the diameter of the casing 8 is slightly greater than the diameter of the rope so that no projections are had which will interfere with the movement of the rope through the grooves of pulleys.

Having thus described my invention, what I claim is:

1. An attachment for rope ends comprising a cylindrical metal member adapted to receive a rope end, fingers cut from the metal member and extending longitudinally of the axis of said member, and teeth projecting inwardly from the side edges of the fingers, means adapted to receive the metal member and force the fingers and likewise the teeth into engagement with the rope end, and a square shoulder on the receiving means for the metal member adapted to engage the free ends of the fingers to lock said vehicles and metal members from displacement of said means.

2. An attachment for rope ends comprising a metal member having fingers cut from its body portion and bent outwardly, teeth disposed along the side edges of the fingers, a casing having an open end and provided with a square shoulder adjacent its open end adapted to engage with the ends of the fingers of the metal member when said member has been inserted into the casing to lock the metal member against displacement from said casing, the fingers on the metal member being adapted to be forced into engagement with the rope end when inserted within said casing.

3. An attachment for rope ends comprising a metal member having fingers cut from its body portion and bent outwardly, teeth disposed along the side edges of the fingers, a casing having an open end and provided with a shoulder adjacent its open end adapted to coact with the end of the fingers of the metal member when said member has been inserted into the casing to prevent displacement of the metal member from said casing, the fingers on the metal member being adapted to be forced into engagement with the rope end when inserted within said casing, and means secured to the closed end of the casing for readily connecting another attaching means to said casing.

4. A connecting means for rope ends comprising a cylindrical metal member adapted to receive a rope end, fingers cut out from the metal member extending longitudinally of the axis of said member and having teeth extending longitudinally along the edges of the fingers and projecting inwardly of the cylindrical member, the free ends of the fingers normally projecting beyond the confines of the outer wall of the cylinder, means adapted to receive the metal member and force the fingers and likewise the teeth into engagement with the rope ends and provided with means engageable with the free ends of the fingers for positively locking the cylindrical member and the last mentioned means together so that the cylinder will be permanently locked to the receiving means.

WILFRED G. NORMAN.